US007726961B2

(12) United States Patent
Baltruschat et al.

(10) Patent No.: US 7,726,961 B2
(45) Date of Patent: Jun. 1, 2010

(54) PRESS

(75) Inventors: Udo Baltruschat, Pinneberg (DE); Holger Behns, Barsbuttel (DE); Carsten Jordt, Geesthacht (DE); Jan Naeve, Schattin (DE); Thomas Pannewitz, Klein Pampau (DE); Martin Plucinski, Asendorf (DE); Harald Romer, Reinbek (DE)

(73) Assignee: Fette GmbH, Schwarzenbek (DE)

( * ) Notice: Subject to any disclaimer, the term of this patent is extended or adjusted under 35 U.S.C. 154(b) by 327 days.

(21) Appl. No.: 11/734,527

(22) Filed: Apr. 12, 2007

(65) Prior Publication Data

US 2007/0251286 A1 Nov. 1, 2007

(30) Foreign Application Priority Data

Apr. 29, 2006 (EP) ................................. 06009002

(51) Int. Cl.
*B29C 43/02* (2006.01)

(52) U.S. Cl. ......................... 425/78; 425/150; 425/171; 425/352

(58) Field of Classification Search ................... 425/78, 425/149, 150, 352–355, 171
See application file for complete search history.

(56) References Cited

U.S. PATENT DOCUMENTS 3,613,166 A * 10/1971 Wallace et al. .............. 425/352
4,260,346 A * 4/1981 Anderson et al. ............. 425/78
5,043,111 A * 8/1991 Hinzmann et al. ............ 425/78
5,813,322 A 9/1998 Kuroda ........................ 100/43
5,906,837 A * 5/1999 Link et al. .................... 425/78
7,229,263 B2 * 6/2007 Silbermann et al. ........... 425/78

FOREIGN PATENT DOCUMENTS

DE 31 42 126 5/1983
DE 103 18 832 A1 11/2003
DE 103 00 722 B3 4/2004
DE 102 54 656 A1 6/2004
EP 1 201 416 A1 5/2002
GB 2 053 074 A 2/1981
JP 05057497 3/1993
JP 07314195 12/1995
JP 10015699 1/1998
JP 200198000 7/2000

* cited by examiner

*Primary Examiner*—Richard Crispino
*Assistant Examiner*—Thu Khanh T Nguyen
(74) *Attorney, Agent, or Firm*—Vidas, Arrett & Steinkraus, P.A.

(57) ABSTRACT

Press for producing dimensionally stable pressed parts from powdered material, with a press frame, a die holding plate, at least one upper punch holding plate, at least one lower punch holding plate, adjusting drives for the upper punch and lower punch holding plate and/or die holding plate, a vertical guide in the press frame for at least the upper and lower punch holding plate and a measuring device for measuring the position of the upper punch holding plate, the lower punch holding plate and/or the die holding plate. A single measuring rule is attached in its thermal fixed reference point to a support vertically uncoupled from the press frame, on which measurement slides cooperating with the holding plates are guided.

11 Claims, 3 Drawing Sheets

PRESS

CROSS-REFERENCE TO RELATED APPLICATIONS

Not applicable.

STATEMENT REGARDING FEDERALLY SPONSORED RESEARCH

Not applicable

BACKGROUND OF THE INVENTION

Presses for producing dimensionally stable pressed parts from powdered material essentially comprise a die, at least one upper punch and at least one lower punch which compress the powdered material from opposing sides in the cavity of the die. The upper and lower punches are, for example, connected to the ram and/or the piston rod of a hydraulic cylinder, which are attached to the press frame. The powdered material is introduced into the die bore by a suitable filling device, the position of the lower punch usually predetermining the filling height and/or the filling volume. After the pressing of the material, the pressed part is removed from the die bore.

Different designs are used with such presses. With so-called single-sided presses, the lower punch and the die are fixed. With double-sided presses, the die is either floatingly or forcibly moved with a fixed or movable lower punch. For removing the pressed part from the mould, either the so-called ejection method or the withdrawal method is used. With the ejection method, the pressed part is moved out of the stationary die by means of the lower punch, whilst with the withdrawal method, the lower punch is stationary and the die is moved.

The press tools are normally not directly attached to the hydraulic adjusting drives, but via so-called adaptors. Thus, for example, the die is clamped to a die holding plate which—if movable—is connected in turn to an adjusting drive by means of force transmission elements. The same applies to upper and lower punches which are attached to corresponding holding plates. As a result, different press tools may be fitted into an existing press.

In the prior art, a press is designed according to whichever principle is used for removal from the mould. A modification to the respective other principle for removal from the mould is, therefore, not normally considered.

For controlling and/or regulating a press process, information about at least two parameters is important. Firstly, the press force is measured in order to determine the maximum force with which the powder is compressed. The press force characteristic of the tools over the path and/or over time during the press process is also possibly useful. A further parameter is the position of the upper and lower punch with regard to a reference value, which is generally formed by the upper edge of the die. In the known manner, temperature effects and the press forces lead to alterations in the length of the press frame, the force transmission elements and the tools. By means of suitable measuring systems, the position of the tools may be measured via their adaptors but, without a correction of the respective temperature and press force, the position indications are not sufficiently accurate. In addition, there is the risk that the measuring systems themselves and/or the attachment thereof suffer temperature-related or press force-related deformation and, therefore, bring inaccuracies into the measurement.

A typical hydraulic press has been made known from DE 102 54 656 B4, the entire contents of which is incorporated herein by reference, in which a die holding plate and a plurality of punch carriers (adaptors) are adjustably mounted in the press frame via hydraulic drives. In the known press, support devices are provided which support the punch carriers in the final position of the press relative to the base body of the press frame. A press for producing stepped, dimensionally stable pressed parts made from ceramic powdered material has been made known from DE 3142126 B1, the entire contents of which is incorporated herein by reference, in which the receiver plates carrying the lower punch may be moved together hydraulically away from a base plate and, in the final position of the press, are positioned as receiving plates against adjustable mechanical stops of the base plate. The receiving plates may be raised together in steps for ejecting the pressed parts after withdrawing the die and releasing the peripheral surface of the pressed part which is in contact with the die, respectively until the next contact surface is released. In the final positions of the press formed by fixed stops, the counter force or supporting force is formed, in both presses, by mechanical stops.

A press has been made known from DE 103 00 722 B3, the entire contents of which is incorporated herein by reference, in which an upper and a lower slide carriage are vertically guided for attaching an upper and lower punch to a guide post. The guide post is fastened to a frame table to which the die holding plate is also attached. The holding plates are guided in a wear-free manner by attaching the sliding carriage to the hydraulic drive via an angle compensation element and a lateral compensation element.

The object of the invention is to provide a press for producing dimensionally stable pressed parts from powdered material, which allows a position identification of the tools with as few errors as possible.

BRIEF SUMMARY OF THE INVENTION

In the press according to the invention, a support for a single measuring rule is uncoupled from the press frame in the vertical direction. Thus a relative movement between the press frame and the support is possible, whereby alterations to the length of the press frame caused by heat and press forces produce no alterations to the length of the support. The measuring rule is, for example, attached to a vertical guide for the holding plates which is uncoupled from the press frame. As the support and/or the vertical guide have, namely, inherent alterations to their length caused by heat, said alterations to the length have to be considered with the measured position values, but alterations to the length of the press frame, in particular also due to press forces, do not have an effect on the measuring rule. The effects of temperature on the spacings between the holding plates are, moreover, also largely of no consequence.

It is advantageous if, according to one embodiment of the invention, the measuring rule is only fastened at the height of a reference plane for the press tools, for example at the height of a clamping surface for the die on the die holding plate. The thermal fixed reference point is naturally located in the centre of a length measuring system. If a plurality of length measuring systems are provided, it results in a change of direction of the longitudinal expansion, when the measurement slide passes through this fixed reference point. In the invention, only one fixed reference point is provided, namely in the reference plane. As a result, thermal expansion of the vertical guide does not interfere with the measuring rule, so that only the thermal expansion of the measuring rule itself has to be considered.

The measuring system according to the invention may be used for different operating modes of a press, irrespective of whether the ejection or withdrawal method is used.

As mentioned above, a specific arrangement of the vertical guide is provided with the invention. According to one embodiment of the invention, it is additionally proposed that the vertical guide is formed by a vertical guide post, which is arranged eccentrically in the press frame relative to the main press axis and comprises two parallel vertical guide tracks for holding plates.

For the arrangement of the guide post, one embodiment of the invention provides that the lower end of the guide post, together with a lower adjusting drive is fastened to the press frame and is secured in all directions and the upper end of the guide post is only secured in the horizontal direction to the press frame, whilst vertical relative movements of the guide post and the press frame are allowed. The guide tracks, according to a further embodiment of the invention, are preferably formed by dovetail-shaped guide rails which are parallel in cross section and which are fastened to the one-piece guide post and guide carriages are guided on the guide rails, to which one respective holding plate is connected.

As no forces are to be transmitted from the holding plates to the guide post, the alignment of the axes of the guided holding plates is desirable. As a result, one embodiment of the invention provides that the upper adjusting drive is located positively in an upper bearing plate, which in turn is screwed to an upper connecting plate of the press frame. An alignment plate is connected to the upper end of the guide post and the bearing plate and alignment plate have a positive connection such that they may only be secured horizontally to one another. The lower adjusting drive is located positively in a lower bearing plate and the guide post is supported on this bearing plate. If a connection of the alignment plate with the upper bearing plate results by means of the positive connection, an alignment of the axes of the upper and lower bearing plate and thus also of the upper and lower punches is thus automatically provided. The bearing plate and alignment plate preferably comprise at least one pair of bores which may be aligned with one another and which respectively receive a locating pin.

The holding plates, tools, vertical guide and measuring rule are naturally subjected to longitudinal expansion depending on the prevailing temperatures. With an accurate measurement of the position of the lower and upper punch and/or of the die, these alterations to the length as a result of heat, therefore, have to be considered. A direct measurement of the upper end of the lower punch and/or the lower end of the upper punch is naturally excluded. The position thereof may, therefore, be only determined by the position of the holding plates. One embodiment of the invention provides that temperature sensors are associated with the press tools and/or the holding plates and/or the vertical guide and/or the measuring rule and a computer is provided, into which the position signals of the measuring rule and the measuring signals of the temperature sensors are entered and, by considering the coefficients of thermal expansion of the materials for the parts of which the temperature is recorded, the computer corrects lengths and thus the positional values of the press tools according to the temperature values.

The press tools are also deformed by means of the press force. According to one embodiment of the invention, it is therefore advantageous if, by means of force measuring elements, the forces exerted on the press tools are measured and the measured values are entered into the computer. The computer corrects the positional values measured by the measuring rule, according to the spring characteristics of the press tools.

BRIEF DESCRIPTION OF THE SEVERAL VIEWS OF THE DRAWINGS

The invention is described in more detail hereinafter with reference to an embodiment, in which.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
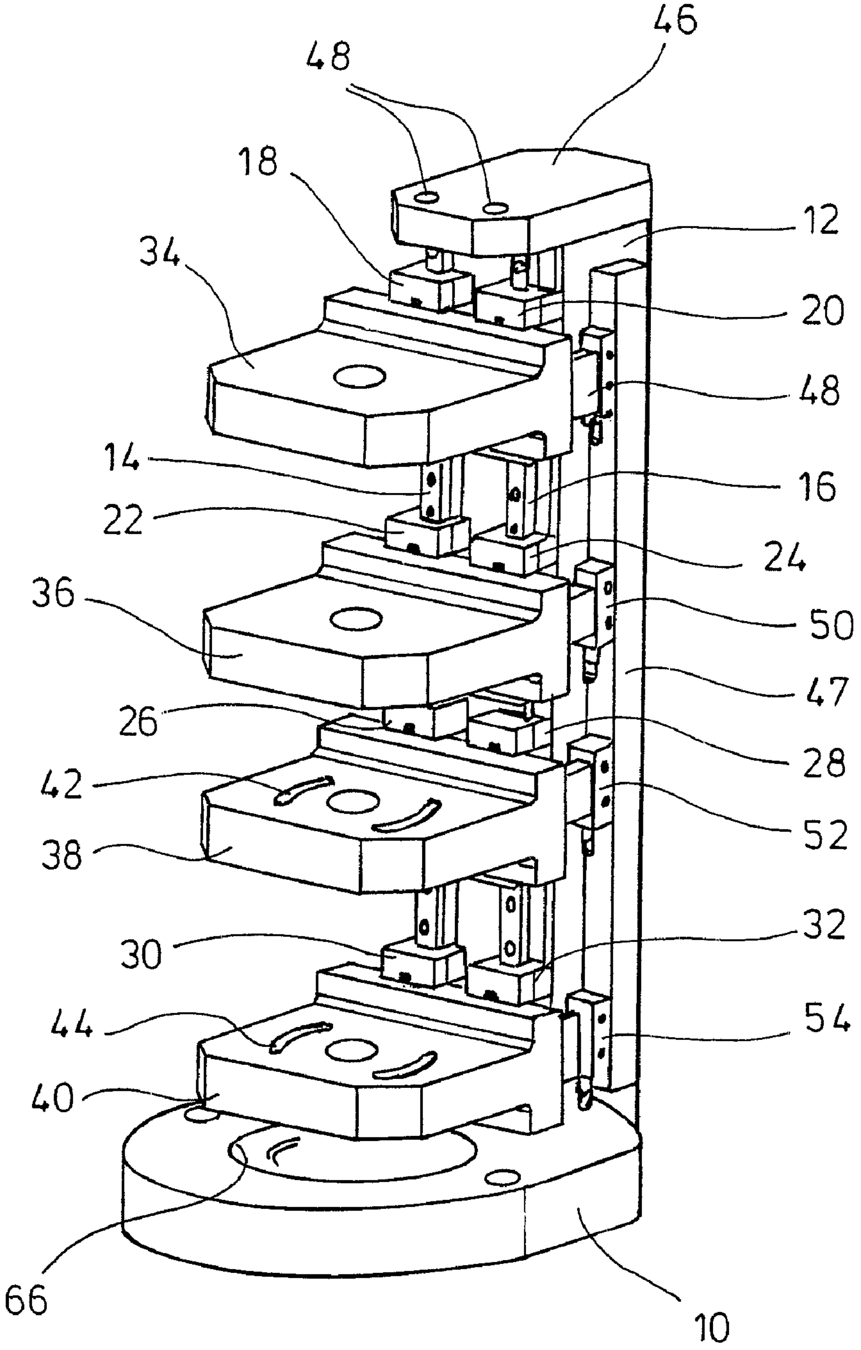
FIG. 1 shows a perspective view of the construction of a bearing arrangement of the holding plates for a hydraulic press without a press frame and hydraulic drives according to the invention.

A bearing plate 10 may be seen in FIG. 1 in which a guide post 12 of substantially rectangular and/or square cross section is supported. The guide post 12 is preferably formed in one piece and may also be configured in one piece with the bearing plate 10.

On one side of the guide post 12 are attached two parallel guide rails 14, 16, preferably by means of screwed connections, which in cross section are dovetail-shaped. The vertical parallel guide rails 14, 16 support guide carriages 18, 20, 22, 24, 26, 28 and 30, 32 which are attached to horizontal, axially spaced holding plates 34 to 40. The holding plates are of substantially the same construction and have a T-shape in section. The upper holding plate 34 serves to clamp an upper punch (not shown), the holding plate 36 is a die holding plate and serves to clamp a die and the lower holding plates 38, 40 serve to clamp lower punches. The holding plates 34 to 40 may be coupled to an upper and lower hydraulic drive, not shown in FIG. 1, for the purpose of vertical adjustment along the guide rails 14, 16. This is described in more detail below. The lower holding plates 38, 40 have apertures 42, 44 for passing through force transmission elements of a lower hydraulic drive to the respective holding plate located thereabove, i.e. in the present case of the die holding plate 36 and/or the holding plate 38.

To the upper end of the guide post 12 a horizontal alignment plate 46 is fastened, which comprises two bores 48 in the vicinity of the free end.

On the right side of the guide post 12 in FIG. 1, a measuring rule 47 is attached on which measurement slides 48, 50, 52, 54 slide. The measurement slides 48 to 54 are respectively coupled to a holding plate 34 to 40. By means of the measurement slides 48 to 54 and the measuring rule 47, the position of the holding plates 34 to 40 is detected and thus the position of the press tools, not shown.

Figure 2:
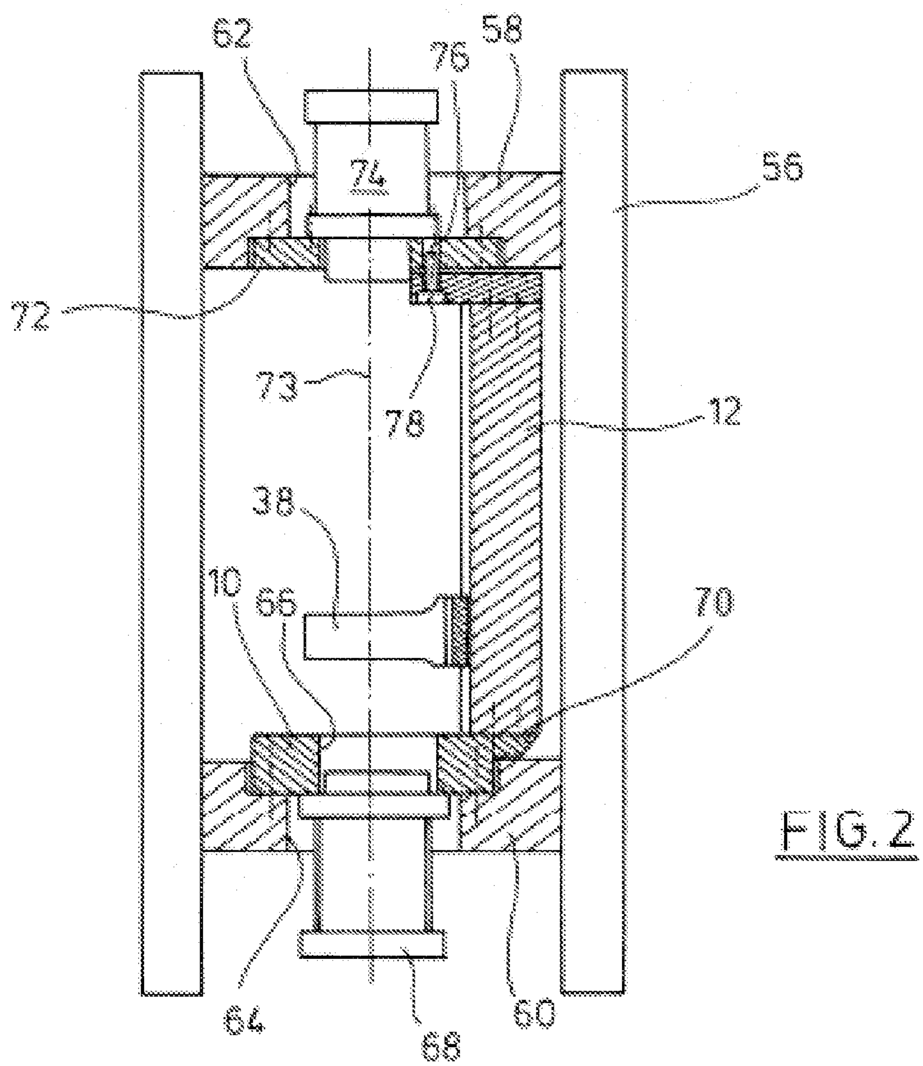
FIG. 2 shows schematically a section through the construction according to FIG. 1 with an indication of the press frame and the upper and lower hydraulic drives.
Figure 3:
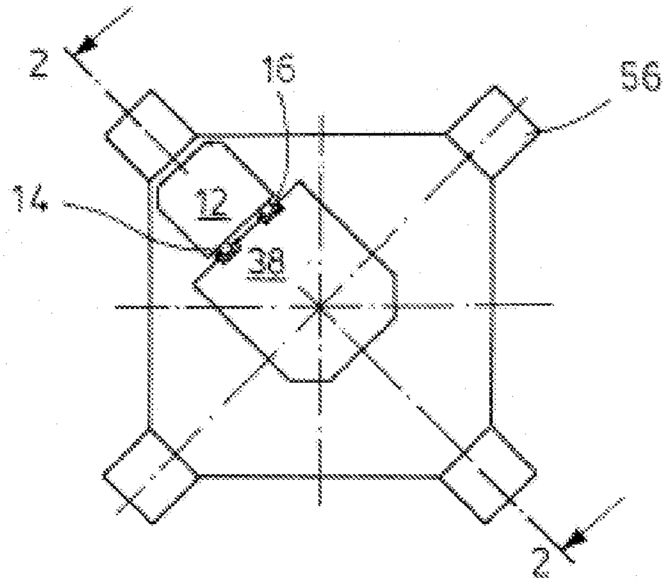
FIG. 3 shows schematically the plan view of the arrangement according to FIG. 2.

The arrangement of the unit shown in FIG. 1 in a press frame is indicated in FIGS. 2 and 3.

As emerges from FIGS. 2 and 3, a press frame has four vertical frame posts 56 arranged in a square, which in the upper region are connected to one another by an upper connecting plate 58 and in the lower region by a connecting plate 60. The connecting plates 58, 60 which extend horizontally, have circular apertures 62 and/or 64.

The lower bearing plate 10 has a circular opening 66 in which a lower hydraulic drive 68 is positively inserted. The bearing plate 10 is screwed in the aperture of the connecting plate 60. The guide post 12 is supported on a radial shoulder 70 of the bearing plate 10 and is screwed thereto. In FIGS. 2 and 3, only one respective holding plate is indicated, for example the holding plate 38 for a lower punch. An upper bearing plate 72 positively receives an upper hydraulic drive 74. The bearing plate 72 may be screwed in the recess of the upper connecting plate 58. The bearing plate 72 has two bores of which one is shown at 76. They may be aligned with the bores 48 of the alignment plate 46. Through the pair of bores, locating pins may be inserted of which one is shown at 78 in FIG. 2. As a result, it is possible to position the bearing plate 72 horizontally relative to the alignment plate 46 and, as a result, also to bring the axis of the upper hydraulic drive 74 into alignment with the axis of the lower hydraulic drive 68, whereby a common vertical axis 73 is achieved. In the vertical direction, a relative movement may be allowed between the guide post 12 and the frame, shown here by the posts 56 and the connecting plates 60, 58.

Figure 4:
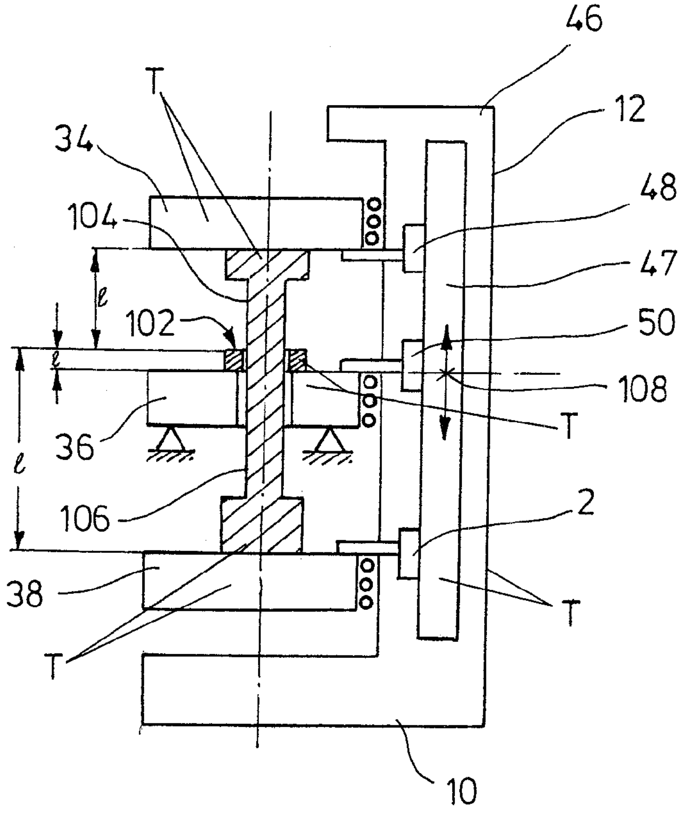
FIG. 4 shows schematically a similar view to FIG. 2 with a position measuring system.
Figure 5:
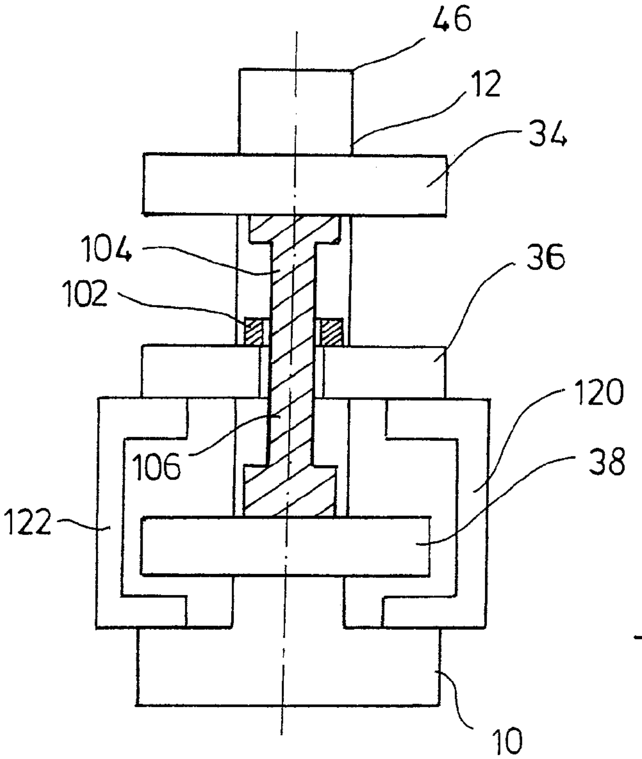
FIG. 5 shows the view of the schematic arrangement according to FIG. 4 in the direction of the arrow 5.

The arrangement according to FIG. 2 is indicated schematically in FIGS. 4 and 5. The same parts in FIG. 2 are shown in FIGS. 4 and 5 with the same reference numerals. A die 102 may also be seen on the die holding plate 36, an upper punch 104 on the upper holding plate 34 and a lower punch 106 on the lower holding plate 38. The upper and lower punches 104, 106 cooperate with the die 102.

The press tools are shown in FIGS. 4 and 5 in a reference position, the upper edge of the die 102 being important for the referencing. By means of the referencing, the tool zero point of the system is determined. Further tools refer to this zero point. The thermal reference plane is the clamping plane of the holding plate 36 for the die 102, i.e. the upper face of the die holding plate 36 with which the measurement slides 50 cooperate. In this plane at 108, the measuring rule 47 is fastened to the post 12 and namely only in this plane.

The measurement of the tool lengths is not directly possible but—as mentioned above—is possible via the holding plates 34 to 38. Thus the temperature, which is measured when referencing, may be included therewith. A temperature measurement takes place at the points denoted with a "T", i.e. on the holding plates 34 to 38, upper punch 104 and lower punch 106 as well as also in the die 102. When the tool lengths 1 are measured during operation, therefore, the value detected during referencing has to be included in the measured temperature. Moreover, alterations to the length occur with the press forces which are measured by means of force transducers, sensors or the like. These values also have to be considered together for the correction of the respective tool positions.

In order to be able to carry out the disclosed operations, a computer is required, into which the signal values measured by the measuring rule 47 as well as the temperature values and force values are entered, in order to calculate the current respective lengths 1 for determining the position of the tools.

Relative to FIG. 5, it still remains to be added that on opposing sides support elements 120, 122 are provided which are supported on the plate 10 and in turn mechanically support the die holding plate 36. They are arranged such that they may be rotated about a vertical axis in order to be arranged optionally below the die holding plate 36 or outside thereof. If the die holding plate is stationary for the ejection method, the support elements 120, 122 adopt the position shown in FIG. 5. With the withdrawal method, however, the die holding plate 36 is movable.

Figure 6:
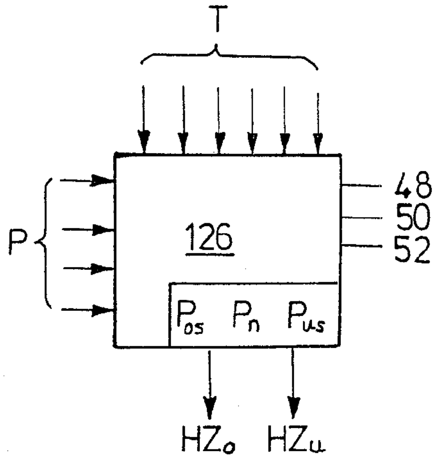
FIG. 6 shows schematically the position indication of the press tool according to FIG. 2.

In FIG. 6 a control computer 126 is indicated into which the temperature values T from the individual sensors are entered. Moreover, individual press forces P which are measured by press force measuring elements, not shown, are entered into the computer 126. The measuring signals of the measurement slides 48, 50 and 52 on the measuring rule 47 are finally entered into the computer and which, by means of the lengths 1 for the lower and upper punches 104, 106 and the die 102, determines the individual positions of the press tools by considering the temperature values and the press force values by which the length values have to be corrected. After measuring the corrected length values, corresponding position values $P_{OS}$, $P_M$ and $P_{US}$ are then recorded for the press tools for the purpose of controlling and/or regulating the hydraulic cylinder for the press tools. In FIG. 6, only the outlets for an upper and a lower hydraulic cylinder are indicated by $HZ_O$ and $HZ_U$.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Press for producing dimensionally stable pressed parts from powdered material, with a press frame, a die holding plate, at least one upper punch holding plate, at least one lower punch holding plate, adjusting drives for the upper punch and lower punch holding plate and/or die holding plate, a vertical guide in the press frame for guiding at least the upper and lower punch holding plate and supporting a measuring rule for measuring the position of the upper punch holding plate, the lower punch holding plate and/or the die holding plate, wherein the vertical guide is uncoupled from the press frame, such that a relative movement between the press frame and the vertical guide is possible, whereby alterations to the length of the press frame caused by heat and press forces produce no alterations to the length of the vertical guide, and the measuring rule is attached to the vertical guide at a thermal fixed reference plane which is the centre of the measuring rule, and wherein a plurality of measurement slides cooperating with the holding plates are guided on the measuring rule.

2. Press according to claim 1, characterised in that the measuring rule (47) is only fastened at the height of a reference plane (108) for the press tools (104, 102, 106).

3. Press according to claim 2, characterised in that the reference plane is the clamping surface of the die holding plate (36) for the die (102).

4. Press according to claim 1, characterised in that the vertical guide is formed by a vertical guide post (12) which is arranged eccentrically in the press frame and comprises two parallel vertical guide tracks for the holding plates (34, 36, 38).

5. Press according to claim 4, characterised in that the lower end of the guide post (12), together with a lower adjusting drive (68), is fastened to the press frame and is secured in all directions and the upper end of the guide post (12) is only secured in the horizontal direction to the press frame, whilst vertical relative movements of the guide post (12) and the press frame are allowed.

6. Press according to claim 4, characterised in that the guide tracks are formed by dovetail-shaped guide rails (14, 16) which are preferably parallel in cross section and which are fastened to the one-piece guide post (12) and guide carriages (18 to 32) are guided on the guide rails (14, 16), to which one respective holding plate (34, 36, 38, 40) is connected.

7. Press according to claim 4, characterised in that the upper adjusting drive (74) is located positively in an upper bearing plate (72), which in turn is screwed to an upper connecting plate (58) of the press frame, and is connected to the upper end of the guide post (12) of an alignment plate (46), the bearing plate (72) and the alignment plate (46) being able to be secured to one another horizontally by a positive connection, the lower adjusting drive (68) being located positively in a lower bearing plate (10) and the guide post (12) being supported on the lower bearing plate (10).

8. Press according to claim 7, characterised in that the upper bearing plate (72) and alignment plate (46) comprise at least one pair of bores (76, 48) which may be aligned with one another for receiving a locating pin (78).

9. Press according to claim 4, characterised in that frame posts (56) span a rectangle, preferably a square, and the guide post (12) is arranged in a corner region of the rectangle and/or square on the inner face of an associated frame post (56).

10. Press according to claim 1, characterised in that temperature sensors are associated with the press tools (104, 102, 106) and/or the holding plates (34, 36, 38) and/or the vertical guide and/or the measuring rule (47) and a computer (126) is provided into which the position signals of the measuring rule (47) and the measuring signals of the temperature sensors are entered and, by considering the coefficients of thermal expansion of the materials for the parts of which the temperature is recorded, the computer (126) corrects the position values and/or the length values of the press tools (104, 102, 106) according to the temperature values.

11. Press according to claim 10, characterised in that by means of force measuring elements the forces exerted on the press tools (104, 102, 106) are measured and entered into the computer (126), and the computer corrects the position and/or length values measured by the measuring rule (47) according to the spring characteristics of the press tools (104, 102, 106).

* * * * *